July 12, 1966     C. A. LINDSTROM, JR., ET AL     3,260,776

PRODUCTION OF BIAXIALLY STRETCH ORIENTED POLYPROPYLENE FILM

Filed Oct. 29, 1964

INVENTORS
CARL A. LINDSTROM, JR.
WILLIAM G. BAIRD, JR.
ARTHUR L. BESSE, JR.
DONALD J. d'ENTREMONT

BY Cushman, Darby & Cushman

ATTORNEYS 3,260,776
PRODUCTION OF BIAXIALLY STRETCH ORIENTED POLYPROPYLENE FILM
Carl A. Lindstrom, Jr., Arlington, Mass., William G. Baird, Jr., Spartanburg, S.C., Arthur L. Besse, Jr., Weston, Mass., and Donald J. d'Entremont, Greenville, S.C., assignors to W. R. Grace & Co., Duncan, S.C., a corporation of Connecticut
Filed Oct. 29, 1964, Ser. No. 407,375
18 Claims. (Cl. 264—95)

This application is a continuation-in-part of application Serial No. 131,696, filed April 6, 1961, which is a division of application Serial No. 713,848, filed February 7, 1958, now Patent No. 3,022,543, and is also a continuation-in-part of application Serial No. 817,246, filed June 1, 1959, now abandoned, which is a continuation-in-part of application Serial No. 713,848, filed February 7, 1958, now Patent No. 3,022,543.

The present invention relates to the production of biaxially stretch oriented polypropylene film.

In parent application Serial No. 713,848 it has been proposed to biaxially orient irradiated polyethylene by blowing a bubble subsequent to an extrusion operation. The resulting product has numerous uses, particularly in the food packaging art. The irradiation step is relatively expensive and requires the use of costly apparatus. When attempts have been made to prepare biaxially oriented polyethylene by the blowing procedure subsequent to extrusion, the results have not been commercially attractive. Thus, it has not been possible to maintain the polyethylene bubble for long periods of time. While runs of short duration were sufficient to obtain samples which could be tested to determine physical and chemical properties, still they are not suitable to prepare a large volume commercial item. Additionally, biaxially oriented polyethylene exhibits considerable shrink at 100° C. While this is desirable in many instances, it is undesirable for some uses, e.g., in preparing baby bottles.

It is an object of the present invention to prepare biaxially oriented polypropylene.

A further object is to prepare biaxially oriented polypropylene film by a process which does not require an irradiation treatment.

An additional object is to devise a continuous process for the preparation of biaxially oriented polypropylene.

Another object is to prepare a biaxially oriented polypropylene film which is more resistant to shrink at 100° C. than biaxially oriented polyethylene film but which has good shrink properties at more elevated temperatures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by heating the polypropylene to a working temperature, preferably stretching the polypropylene while above room temperature in at least one direction as it comes out of the extruder for more precise control of the final properties of the film and then bilaterally hot stretching with a bubble to orient the polymer and cooling the stretched polymer while under tension to a temperature at which the polymer will retain its form when the tension is released.

It is desirable to cool subsequent to the extrusion and prior to the later bilateral hot stretching in order to facilitate the further handling and processing of the polypropylene without difficulty. It is important that the tension on the bilaterally stretched polypropylene be maintained until the polypropylene is cooled sufficiently that premature shrinking does not occur.

The biaxially oriented polypropylene of the present invention can be utilized to prepare films for packaging food and other materials, shrinking bags, bottle caps, boiling water resistant containers.

The biaxially oriented polypropylene has a percent shrink of 20 to 60% at a temperature of 145° C. but has a percent shrink at 100° C. of only 3 to 6% and in some instances even less. Additionally, the biaxially oriented polypropylene has high shrink energy or tension at elevated temperatures, e.g., 100 p.s.i. and above at 150° C.

The biaxially oriented polypropylene is water-white and has outstanding clarity as is illustrated by a haze of less than 6.0%, e.g. 2%, and diffuse reflectance of not over 1%.

The biaxial orientation is accomplished by careful balancing of the deformation stress of the initially thick material at orientation temperature and the tensile strength of the final relatively thin material, i.e., the deformation stress of the initial thick polypropylene is low enough and the tensile strength of the final polypropylene high enough so that the internal gas pressure of the bubble necessary to stretch the thick material at orientation temperature will not break the thin film. The initial thickness of the polypropylene can be from 4 to 60 mils, desirably 6 to 25 mils, and the final film thickness 0.25 to 5 mils, desirably 0.3 to 1.5 mils. The diameter of the polypropylene tube prior to the bilateral stretching (so-called tape) is generally 0.5 to 12 inches and even greater if circumstances require. The diameter after the bilateral stretching in the form of a bubble is generally 100 to 900% greater than the original inner diameter. It has been found preferable to stretch the polypropylene in the bubble longitudinally 100 to 600% and transversely 300 to 800%.

Several methods can be used to prepare the polypropylene prior to biaxially orienting it according to the invention.

In one process polypropylene is extruded from the circular die of a conventional extruder in the form of tubing at a temperature of from 175 to 300° C. and drawn down into a quenching bath of propylene glycol, Carbowax 400 (polyethylene glycol having an average molecular weight of 400) or other substantially inert liquid, e.g., at −10 to +125° C., preferably 0 to 80° C., and through a pair of pinch rolls. The extrusion of the polypropylene in the molten condition is frequently between 175 and 260° C. The extruded polypropylene is then quenched, as indicated above, often to room temperature or below, e.g., 10° C., as shown in FIGURES 1 and 2. At temperatures below 100° C. the inert liquid can be water. Preferably, the inside of the tubular material is partially filled with a liquid, e.g., propylene glycol or Carbowax 400 or, less preferably, water to aid in controlling the diameter of the tape. A small amount of anti-tack material, e.g. talc, diatomaceous earth, etc., can be added to the liquid inside the tube to prevent adhesion of the wall when subsequently pressed flat by the deflate rolls. The diameter of the cooled polypropylene tubing varies from 40 to 200% of the die orifice diameter and the longitudinal stretch varies from about 50 to 500%.

In an alternative process the tube is taken from the die orifice in any convenient direction to a pair of feed rolls and inflated with a gas, e.g., air, to stretch it and cool it by maintaining a bubble between the face of the die and a pair of pinch rolls located at a fixed distance, e.g., at least 2 bubble diameters from the face of the die. In this procedure the polypropylene is usually stretched 100 to 500% laterally and 100 to 500% longitudinally.

Whether the first or second procedure just described is employed the polypropylene tubing is then heated and stretched biaxially. As a general rule, the biaxial stretching is preferably carried out at a temperature between the crystalline melting point of polypropylene and 10° C. therebelow, although a temperature of 25° C. below the crystalline melting point can be employed. Typical temperatures which can be used are 130 to 150° C. The crystalline melting point is determined by heating a piece of the polypropylene between crossed polarizers while being viewed under the microscope. The heating is continued until the birefringence caused by placing the polypropylene between the polarizers disappears. The temperature of disappearance is the crystalline melting point. At this temperature, all crystallites have disappeared and the polypropylene is in the amorphous condition. The stretching is then done to an extent of 300 to 800% laterally and 100 to 600% longitudinally as compared with the tubing prior to such stretching. The polypropylene is immersed in a bath of hot inert liquid, e.g., propylene glycol, Carbowax 400, Wood's alloy or other liquid metal, e.g., at a temperature of at least 150° C. but not above the crystalline melting point of the polypropylene. On emerging from the bath, the tube is inflated with air, or other gas to form a trapped bubble in the section between the surface of the hot bath and the deflate rolls above. Preferably, all of the expansion takes place below the surface of the liquid. The bubble is then normally air cooled, e.g., to room temperature before passing through the deflate rolls. The polypropylene is fed in the form of tubing at low or high speeds, e.g., 1 to 40 feet/min. into the bath.

It has also been found possible to biaxially orient the polypropylene and to omit the hot liquid bath by heating the tubing in an oven and when it has attained a uniform temperature of not less than 25° C. below the crystalline melting point blow the bubble as the tubing comes out of the oven. This procedure has the advantage that it eliminates the steps of washing off the inert liquid and then drying the polypropylene.

It has been found that polypropylene tubing can be continuously blown according to the invention. Thus, in one demonstration an entire roll of polypropylene tubing was biaxially oriented by the bubble technique described above in a run which lasted over ten minutes. In contrast, polyethylene cannot be so blown for such an extended period of time without special regulation and constant supervision of operating conditions.

Figure 1:
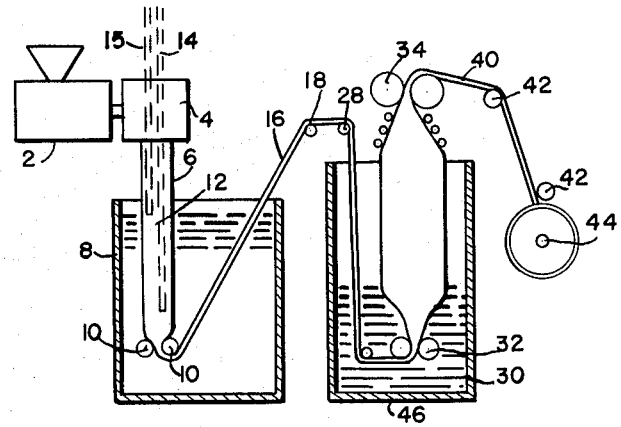
FIGURE 1 is a schematic diagram of one method of carrying out the invention.

Referring more specifically to FIGURE 1, polypropylene is fed into a conventional saran type extruder 2, e.g., a 2½ cross head die, and extruded at a temperature of 260° C. through the orifice in a die head 4 to form a soft plastic tube 6. The tube is extruded downwardly into a cooling bath 8 of propylene glycol or other inert liquid maintained at 0 to 80° C., for example. The extruded tube is quickly chilled in this bath. The distance between the die orifice and the surface of the cooling liquid is kept small, e.g., ⅛ inch to 2 feet, to avoid undesirable distortion of the soft, freshly extruded tube.

The extruded tube is withdrawn from the die orifice downwardly through the cooling bath by a pair of driven rolls 10 rotating at a surface speed of 1 to 40 feet/min. immersed in the cooling liquid. The two rolls are preferably both driven by gears to prevent slipping. The speed of withdrawal is usually 100 to 600% greater than the speed of the polymer at the die face to avoid undue sagging of semi-fluid plastic as it issues from the die orifice, as well as to control the properties of the end product.

As the tube passes through the cooling bath a liquid 12 inert to the polymer, e.g., propylene glycol, is recirculated through ducts 14 and 15 in the die head into the newly formed tube. This liquid is maintained at a substantially constant head with respect to the level of the cooling fluid in the bath and is maintained at approximately the bath temperature. The pinch rolls 10 serve to prevent the carrying of other than a trace of liquid material inside the tube out of the cooling zone.

The diameter and wall thickness of the tube thus formed depend upon the dimension and shape of the die orifice, head of liquid material within the tube, pressure in the tube, speed of the polymer through the die orifice, and speed with which the tube is withdrawn from the orifice by the pinch rolls. The wall thickness may vary from 4 to 60 mils in thickness and the diameter can be any convenient size, e.g., 0.5 to 12 inches.

The flattened tubing or tape 16 is fed via feed rolls 18 and 28 into a hot bath 30 in racking tank 46 which contains propylene glycol or other liquid substantially inert to the polymer. This liquid is maintained at a temperature within 25° C. of the crystalline melting point and preferably within 10° C. but not above the crystalline melting point. A bath temperature of 150° C. has been found convenient for polypropylene commercially available at the present time. The tape is fed from a pair of feed rolls 32 rotating at a surface speed of 1 to 40 feet/min. and immersed in the hot bath, to a pair of deflate rolls 34 mounted above the hot bath and rotating at a surface speed of 3 to 200 feet/min. It should be understood that the higher deflate roll speeds are used with the higher feed roll speeds. Air or other gas is introduced into the heated tape to form a gas bubble 38 between the surface of the hot bath and the upper deflate rolls 34 in the air. Preferably, 100% expansion of the bubble takes place in the bath 30 although the expansion in the bath may be only 95% or even 50% of the final bubble diameter. The film is cooled as it passes in the air from the surface of the hot bath to the deflate rolls. The bubble is gradually flattened with the aid of converging rolls 36. The diameter of the gas bubble is generally 6 to 60 inches and the speed differential between the pair of feed rolls 32 and the pair of deflate rolls 34 is usually a ratio of from 1 to 2 up to 1 to 6. In general, the diameter of the gas bubble and the speed differential between the pair of feed rolls 32 and the deflate rolls 34 is such as to produce a stretch of from 100 to 900% in each direction, generally being from 100% up to 600% longitudinally and from 300% up to 800% laterally. Further stretching is limited only by the point at which the polypropylene will break. Following the collapse of the bubble by deflate rolls 34, the flattened tubing 40 is fed with the aid of guide rolls 42 to roll 44 on which it is wound. The finished tubing generally has a thickness of 0.3 to 3 mils. The liquid clinging to the outside of tubing 40 can be washed off with water, and water removed by drying with towels, hot air, etc.

It is desirable that the neck 48 of the bubble 38 be immersed in the liquid bath 30 and, as previously set forth, a major proportion, preferably 100%, of the expansion of the tube takes place in the bath. However, the bubble is not completely immersed so that it will not break too easily. When it is desired to make film from the tubing, this can readily be accomplished by slitting the tubing as it leaves deflate rolls 34. As previously indicated, in racking to form bubble 38 the propylene glycol or other relatively inert liquid can be at a temperature of 130 to 150° C. Often 50 to 95% of the maximum diameter of the bubble is formed in the liquid with the balance occurring after the tubing emerges from the bath.

Figure 2:
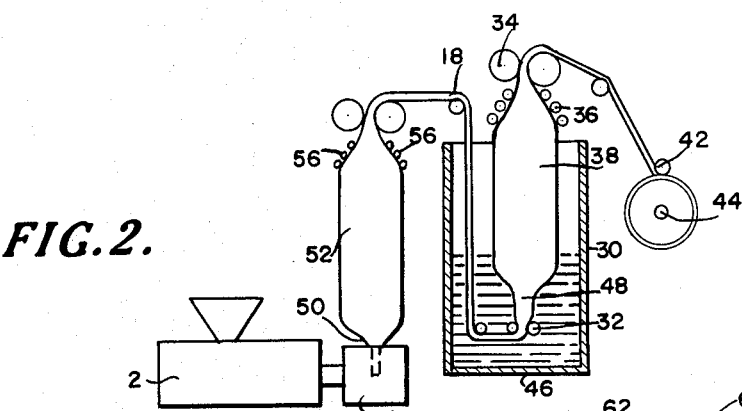
FIGURE 2 is a schematic illustration of an alternative procedure.
Figure 4:
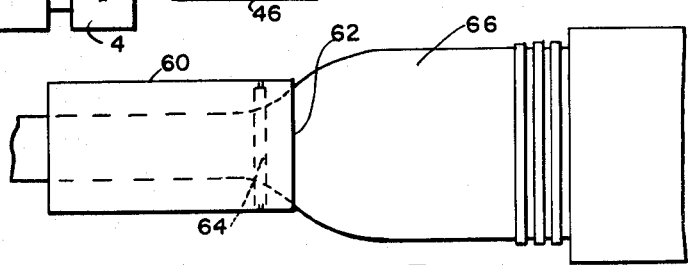
FIGURE 4 is a partial side elevation of the apparatus of FIGURE 3.

In the alternative form of the invention illustrated in FIGURE 2 the polypropylene tubing 50 as it leaves the die head 4 in an upward direction is formed into a bubble 52 with the aid of air or other entrapped gas maintained between the die head 4 and deflate rolls 54. The gas bubble generally has a diameter of 2 to 15 inches. Deflate rolls 54 are rotated at a surface speed of 1 to 20 feet/min. The gas bubble is flattened at the upper end with the aid of converging rolls 56. The flattened tube 16 is then further processed in the same way as in FIGURE 1.

Figure 3:
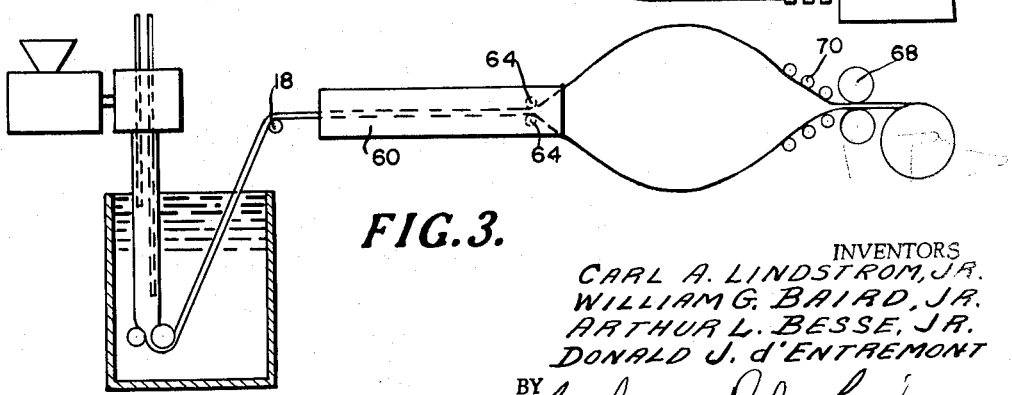
FIGURE 3 is a schematic illustration showing an alternative method of blowing.

It has also been found that it is possible to eliminate the use of the hot liquid bath 30 and the bubble 38 can be blown entirely in air by utilizing the procedure of FIGURE 3. As shown in FIGURE 3, the polypropylene tape after it passes over feed roll 18 enters oven 60 maintained, for example, at 150° C. The oven is sufficiently long that the polypropylene will be heated to a temperature at which it can be readily blown into a bubble. By the use of festooners the length of oven can be reduced and the tape heated as it follows a tortuous path. As the tape emerges from the oven at the exit 62 there are positioned pinch rolls 64 and air or other gas is introduced into the heated tape to form a gas bubble 66 between the exit pinch rolls 64 and deflate rolls 68. The bubble is gradually flattened with the aid of converging rolls 70.

While the process is preferably carried out continuously, it can be carried out intermittently, e.g., the polypropylene after it is extruded can be formed into a roll and then fed from this roll to form the final bubble 38.

The polypropylene film can be coated, e.g., with a vinylidene chloride polymer such as Saran F–120 (a vinylidene chloride-acrylonitrile copolymer) or other material in any convenient manner, to afford a barrier to the passage of gases, moisture and liquids. Thus, after the polypropylene leaves deflate rolls 34 and before it passes to roll 44 it can pass through a solution of Saran F–120, 200 cps. grade, as a 7% solution in methyl ethyl ketone to give an over-all coating of the polypropylene surface with the Saran. To insure better adhesion of the Saran the polypropylene either as tubing or sheet film can be treated with an oxidizing flame or with corona discharge, ozone or other oxidizing means prior to the treatment with the Saran.

*Example 1*

Using the apparatus of FIGURE 1 polypropylene (Hoechst, density 0.90) was extruded at a temperature of 245° C. to form a tube having a wall thickness of 6 mils and a tube diameter of 0.75 inch using a die having a diameter of 1.5 inches. Cooling bath 8 was filled with water maintained at 21° C. The distance between the die orifice and the surface of the bath was 4 inches. Rolls 10 were rotating at a surface speed of 9 ft./min.

The longitudinal stretch between die 4 and rolls 10 was 300%. Water at a temperature of 21° C. was recirculated through ducts 14 and 15 to maintain the head of liquid at approximately 3 inches below the die. The tubing then passed over rolls 18 into hot bath 30 containing propylene glycol maintained at 140° C. Feed rolls 32 rotated at a surface speed of 9 ft./min. and deflate rolls 34 at a surface speed of 27 ft./min. Air bubble 38 in its main portion had a diameter of 6 inches and 85% of the expansion occurred in the bath. The transverse stretch was 8 to 1 and the longitudinal stretch was 3 to 1. The finished tubing had a wall thickness of approximately 0.25 mil.

*Example 2*

Using an apparatus of the type of FIGURE 1 polypropylene (Hercules Profax) was extruded at a temperature of 260° C. using a 2½ inch cross head die to form a tube having a wall thickness of 10 mils and a 1.5 inch flat width. Cooling bath 8 was filled with propylene glycol maintained at 7° C. The distance between the die orifice and the surface of the bath was 10 inches. Propylene glycol at a temperature of 7° C. was recirculated through ducts 14 and 15 to maintain the head of liquid at approximately 10 inches below the die. Rolls 10 were rotating at a surface speed of 9.8 ft./min. The tubing then passed over rolls 18 into hot bath 30 containing Carbowax 400 at 150° C. Feed rolls 32 rotated at a surface speed of 9.8 ft./min. and deflate rolls 34 at a surface speed of 28.4 ft./min. The air bubble formed had a flat film width of 10.5 inches and a thickness of 0.3 mil. The transverse stretch in blowing the bubble was 7 to 1 and the longitudinal stretch was 3 to 1.

The biaxially oriented polypropylene has numerous uses. Thus, it can be employed as a closure for bottles, cans or the like, e.g., as a bottle cap which can be shrunk tight by the application of heat. Likewise, it can be employed to form bottles or bags. By the use of sufficient heat the bags can be heat shrunk, around turkeys or other articles. In the form of film the biaxially oriented polyethylene can also be employed as a packaging material, e.g., an overwrap. The product can also be employed as a lid for jelly dishes.

It will be observed that in one aspect of the invention polypropylene film having improved shrink energy is obtained by stretching the polypropylene, cooling the polypropylene, heating the stretched polypropylene and then bilaterally stretch orienting the polymer at such elevated temperature and then cooling prior to release of stretching tension. The initial stretching, it will also be noted, can be in one direction.

We claim:
1. A method of making an oriented tubular article of isotactic polypropylene which consists of melt extruding a tube of said polymer, immersing and quenching said extruded tube in a bath of a non-solvent liquid for said polymer at a temperature of about 7 to 10° C. and at a distance of from ⅛ to 4 inches from the die, then heating said quenched tube to a temperature within its softening range and biaxially stretching said heat softened tube.

2. A method according to claim 1 wherein said quenching occurs at a distance of ⅛ inch from the die.

3. A method according to claim 1 wherein the extruded tube, prior to the heating, has a diameter of 40% to 200% of the die orifice diameter and has a longitudinal stretch of from 50% to 100%.

4. A method of making an oriented tubular film of isotactic polypropylene which consists of melt extruding a tube of said polymer, immersing and quenching said extruded tube in a bath of a nonsolvent liquid for said polymer at a temperature not over room temperature and at a distance of from ⅛" to 10" from the die, the diameter of the cooled tubing being from 40% to 200% of the die orifice diameter and the longitudinal stretch of the tubing being from 50% to 500%, then heating said quenched tube to a temperature within a softening range and biaxially stretching said heat-softened tube.

5. A process according to claim 4 wherein said quenching occurs at a distance of ⅛" from the die and said heating is at a temperature of 130° to 150° C.

6. A method of producing biaxially oriented polypropylene consisting of heating polypropylene which has been stretched 50 to 500% longitudinally to a temperature of not lower than 25° C. below the crystalline melting point thereof and then simultaneously bilaterally stretch orienting the hot polypropylene and cooling prior to release of stretching tension, said bilateral stretch orienting being to an extent of 100 to 900% in each direction.

7. A method according to claim 6 including the additional step of coating the bilaterally stretch oriented polypropylene film with a vinylidene chloride polymer.

8. A method according to claim 7 wherein the vinylidene chloride polymer is applied in the form of a solution.

9. A method of producing polypropylene film having improved shrink energy consisting of stretching polypropylene to an extent of 50 to 500% longitudinally, cooling the polypropylene, heating the polypropylene to a temperature not lower than 25° C. below the crystalline melting point thereof and then simultaneously bilaterally stretch-orienting the polypropylene at such elevated temperature and cooling prior to release of stretching tension, said bilateral stretch orienting being to an extent of 100 to 900% in each direction.

10. A method according to claim 9 wherein the bilateral stretching is carried out to an extent of 300–800% transversely and 100–600% longitudinally.

11. A process according to claim 10 wherein the transverse stretch is in excess of the longitudinal stretch.

12. A method of producing biaxially stretch oriented polypropylene consisting of heating to a temperature of not lower than 25° C. below the crystalline melting point thereof an extruded tube of polypropylene which has been longitudinally stretched from 50 to 500%, introducing and maintaining fluid pressure in said heated tube between constricting means and a pair of opposed pressure means in sufficient amount to fill the tube and establish internal pressure to distend the tube 100 to 900% in a lateral direction to form a bubble and acting on the tube by said opposed pressure means at a differential rate to stretch the tube 100 to 900% in a longitudinal direction and cooling prior to release of stretching tension.

13. A method according to claim 12 including the additional steps of applying a solution of a vinylidene chloride polymer to the bilaterally stretch oriented polypropylene after releasing the stretching tension and thereafter winding the tubing into a roll.

14. A method according to claim 12 wherein the polypropylene is stretched 300 to 800% transversely and 100 to 600% longitudinally by the formation of said bubble.

15. A method according to claim 14 wherein gas pressure is maintained in said heated tube between two pinching means to distend the tube and form said bubble.

16. A method of producing coated biaxially oriented polypropylene consisting of continuously heating polypropylene which has been stretched 50 to 500% longitudinally to a temperature of not lower than 25° C. below the crystalline melting point thereof, then simultaneously bilaterally stretch orienting the hot polypropylene, said stretching being 300–800% transversely and 100–600% longitudinally, cooling prior to release of stretching tension, said bilateral stretch orienting being to an extent of 100 to 900% in each direction, then coating the bilaterally stretched polypropylene with a vinylidene chloride polymer and winding the coated stretched polypropylene into a roll.

17. A method of making an oriented tubular article of isotactic polypropylene which consists of melt extruding a tube of said polymer, immersing and quenching said extruded tube in a bath of a non-solvent liquid for said polymer at a temperature of about 7° C., then heating said quenched tube to a temperature within its softening range and biaxially stretching said heat-softened tube.

18. A method of making an oriented tubular article of isotactic polypropylene which consists of melt extruding a tube of said polymer, immersing and quenching said extruded tube in a bath of a non-solvent liquid for said polymer at a temperature of about 7 to 10° C., then heating said quenched tube to a temperature within its softening range and biaxially stretching said heat softened tube.

References Cited by the Examiner

UNITED STATES PATENTS

| | | |
|---|---|---|
| 2,748,027 | 5/1956 | Meier. |
| 2,805,963 | 9/1957 | Gaylord _____ 117—138.8 |
| 2,952,867 | 9/1960 | Diedrich et al. _____ 264—98 |
| 3,022,543 | 2/1962 | Baird et al. _____ 264—22 X |
| 3,146,284 | 8/1964 | Markwood _____ 264—210 |

ALEXANDER H. BRODMERKEL, *Primary Examiner.*

A. L. LEAVITT, *Assistant Examiner.*